March 22, 1960   C. H. JENKINS   2,929,299
CUTTING TOOL

Filed March 13, 1958   3 Sheets-Sheet 1

INVENTOR
CARLTON H. JENKINS
BY Benjamin G. Weil
ATTORNEY

March 22, 1960   C. H. JENKINS   2,929,299
CUTTING TOOL

Filed March 13, 1958   3 Sheets-Sheet 2

INVENTOR
CARLTON H. JENKINS
BY Benjamin G. Weil
ATTORNEY

March 22, 1960
C. H. JENKINS
2,929,299
CUTTING TOOL
Filed March 13, 1958
3 Sheets-Sheet 3
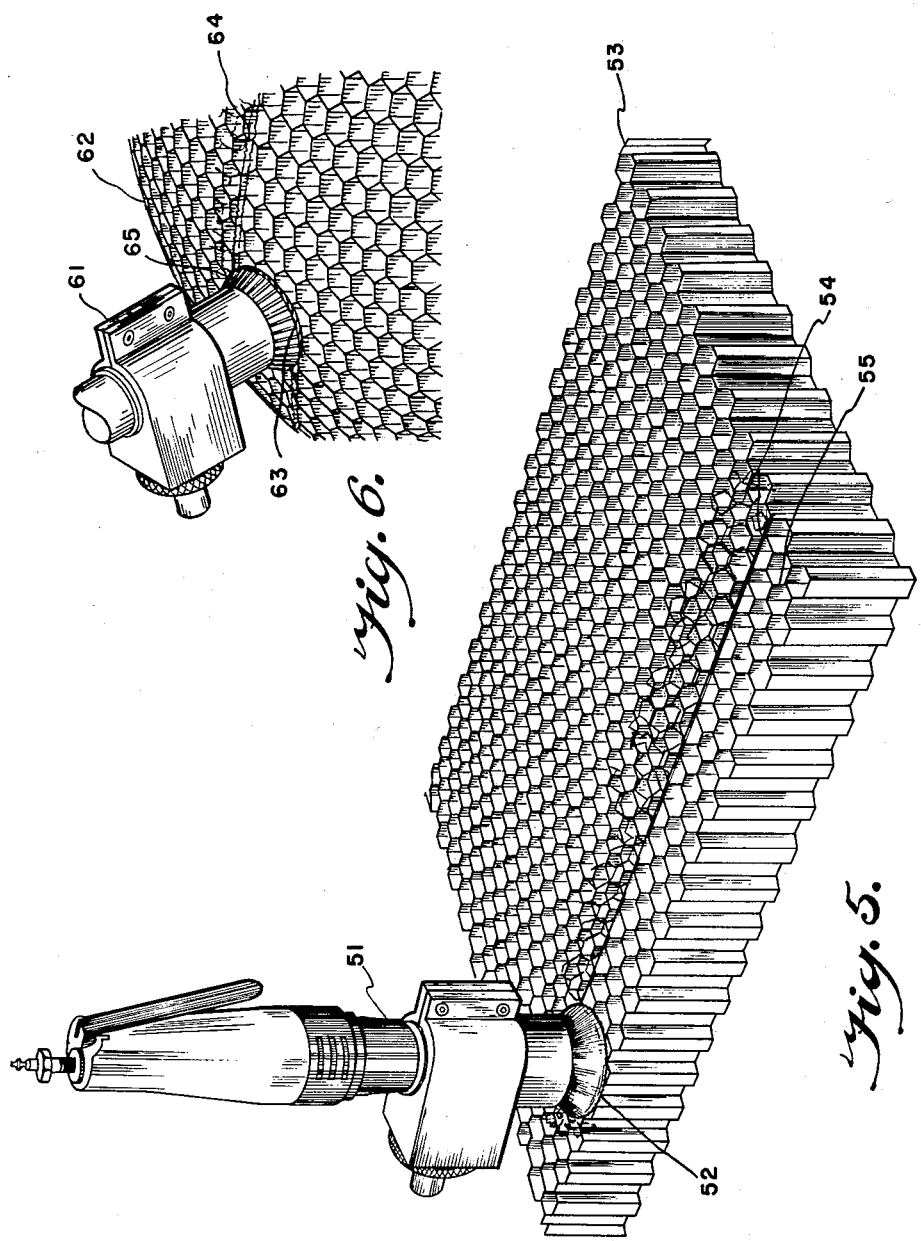
INVENTOR
CARLTON H. JENKINS
BY Benjamin G. Weil
ATTORNEY United States Patent Office 2,929,299
Patented Mar. 22, 1960

2,929,299

CUTTING TOOL

Carlton H. Jenkins, Baltimore, Md., assignor to The Martin Company, a corporation of Maryland Application March 13, 1958, Serial No. 721,167

10 Claims. (Cl. 90—12)

This invention relates to cutting devices and more particularly to a cutting device having contra-rotating cutters.

In cutting easily deformable cellular material like low-density aluminum honeycomb with conventional plane cutters, such as a saw, burrs and bent edges are created along the cutting line. The as-cut surface, being ragged and distorted, is unsuitable for use in structures fabrication where a smooth surface is necessary for acceptable structural bonding of the honeycomb to other parts. This problem of satisfactorily shaping low-density honeycomb becomes more serious in cutting rounded contours, because, with plane cutters, forces tending to distort the worked material must be applied by the operator through the cutting blade while guiding it over the surface to be contoured. As a result it has been found to be impossible to cut rounds in such material without producing undesirable distortions using conventional cutters. In an attempt to obviate the shortcomings described above, resort was had to another cutting method in which a solid block of wood shaped to the desired contour was placed over the honeycomb and pounded into it, thereby producing the required profile. In this process, however, the cell structure was distorted, and the density of those honeycomb layers compacted together by pounding was increased, so that articles manufactured in this way were heavier than similar articles which were cut to size. As is well known, weight is very important in the airframe industry, a major user of structural honeycomb, especially with regard to missile construction. Moreover, this method requires special tooling for contours of different types and sizes.

The present invention provides a novel device for improved cutting of easily deformable material like low-density honeycomb without producing distortions or burrs. It is especially suitable for smooth cutting of rounded surfaces in such material, heretofore found to be impossible. In addition to simple convex surfaces, the present invention will cut compound contours as well as steps and offsets.

In accordance with the present invention, two toothed cutting discs, shaped so as to present a concave working surface, are maintained in closely-spaced relationship and caused to rotate at substantial speed in opposite directions by a special gear and shaft arrangement. As a result the peripheral cutting teeth effect a shearing action when engaged with the cell walls of cellular material.

The gear and shaft arrangement and the discs connected thereto can be assembled into a unit which is readily installable on a motor tool such as an electric- or air-powered drill.

Other features and advantages of the invention will become apparent upon consideration of the following detailed description and accompanying drawings of exemplary embodiments.

In the drawings:

Figures 5 and 6 show the action of this invention on a honeycomb type of material.

Figure 1:
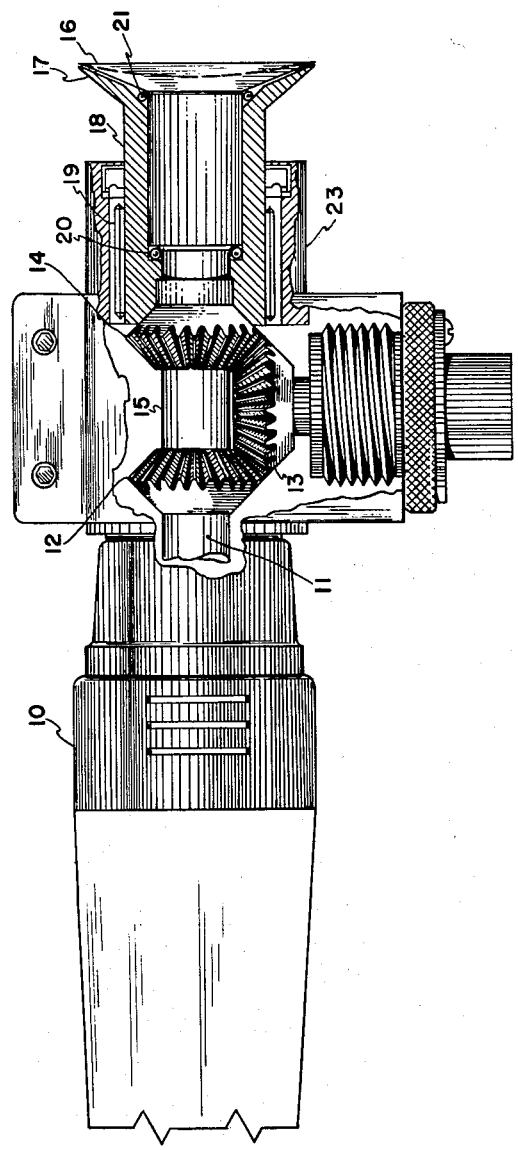
Figure 1 is a partially-sectioned, over-all view of a cutting implement embodying the invention in one form.

Referring to Figure 1, a motor 10 turns shaft 11, attached gear 12, and shaft 15 which is an extension of shaft 11. Gear 14 through which shaft 15 passes freely (see Figure 3) is connected to shaft 18, the latter being concentrically positioned over that part of shaft 15 extending beyond gear 14. Outer disc 16 and inner disc 17 which are concavoconvex in shape are attached to shafts 15 and 18, respectively. A removable idler gear 13 engages gears 12 and 14, so that when motor 10 turns gear 12 and shaft 15 in one direction, idler gear 13 is also caused to rotate, and thereby to turn gear 14 and attached shaft 18 in the opposite direction. Consequently, discs 16 and 17 are also made to rotate at the same speed in opposite directions. To provide for proper spacing and smooth rotation of shafts and discs during operation, bearings 19 are placed between shaft 18 and housing 23, bearings 20 between shafts 18 and 15 and bearings 21 between discs 16 and 17.

Figure 2:
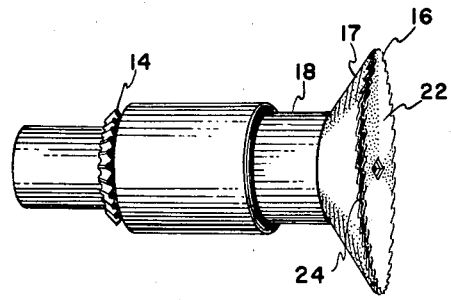
Figure 2 is a view of the cutting discs of this invention in working relation to each other.
Figure 3:
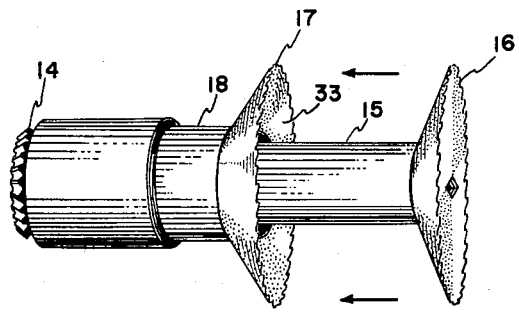
Figure 3 is an exploded view of the cutting discs shown in Figure 2.

The concave working surface 22 of outer disc 16 is shown in Figures 2 and 3. Inner disc 17 is formed with a recess 33 to accommodate disc 16. Each disc has substantially the same number of saw teeth, and ball bearings 21 (see Figure 1) maintain a spacing between opposing teeth of about 0.002 inch, so that they coact in a clipping rather than a milling action.

A concavity of 3° is preferred although the degree of concavity of the outer disc may be varied between approximately 1° and 10°. The discs are operated preferably at speeds between 1000 to 2000 revolutions per minute.

Figure 4:
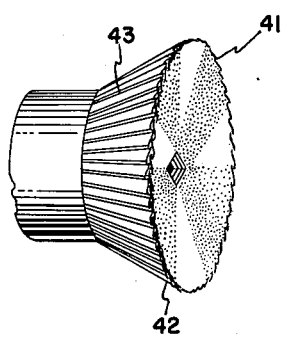
Figure 4 is a view of a modified form of the cutting discs of this invention.

Figure 4 illustrates another embodiment of the present invention. Inner disc 42 is provided with longitudinal teeth 43 on its exterior surface, which tear away material that has been cut and clear it from the path of the cutting edges.

Figure 5 shows the embodiment of this invention described in connection with Figures 2 and 3 being used to cut a step 55 in honeycomb material 53. The tool 51 with cutting discs 52 of the same type as discs 16 and 17 in Figure 2 is passed through a thin layer of the material leaving behind a smooth surface. The cut material 54 is folded back, as shown, during the cutting operation. This operation may be repeated by cutting swaths parallel to the first so as to remove the material previously folded back. If cutting discs of the type described in connection with Figure 4 are used, the material cut away will be shredded into small pieces and cleared away from the path of the cutter rather than being folded back.

The cutting of a spherical contour in honeycomb is shown in Figure 6. Cutting device 61 has cutting discs of the same type as described in connection with Figure 4 is guided along a curved profile 62. The cutting edges 63 cut through a layer of material 64 which is then quickly torn away by the action of the teeth 65 on the surface of the outer disc. Because of the concave surface of the inner disc, it can easily follow the rounded contour. Since no distorting forces need be applied, the newly-cut surface is smooth and regular, exhibiting no burrs or cell distortions.

It is understood that the invention claimed herein is not restricted to the exact structure of the preferred embodiment described above, but comprises also those variations of structural features which would occur to a skilled

I claim:

1. A cutting device for contouring easily deformable cellular material comprising inner and outer rotary cutting discs provided with peripheral cutting teeth, said discs being of substantially the same diameter and disposed in closely spaced relationship with their axes of rotation coincident; means for driving said inner and outer cutting discs at substantial speed in opposite directions, the surface of said outer cutting disc being concave, whereby said cutting discs can be used to contour cellular material while the latitudinal planes of the cutting discs are substantially parallel to the plane of the surface being cut.

2. A device as defined in claim 1 wherein said inner and outer cutting discs are mounted on concentrically rotatable coaxial shafts both operably coupled to said driving means.

3. A device as defined in claim 2 wherein bearing means are disposed between said cutting discs to maintain a fixed optimum relationship between said cutting discs whereby it is insured that said discs provide a shearing action along a narrow cutting plane.

4. A device as defined in claim 3 wherein the surface of said inner cutting disc opposite said driving means is recessed to receive said coaxially rotatable outer cutting disc substantially within said recess.

5. A device as defined in claim 4 wherein the concave surface of said outer cutting disc opposite said driving means is formed with a degree of concavity between 1° and 10°.

6. A cutting device for contouring easily deformable cellular material comprising inner and outer rotary cutting discs provided with peripheral cutting teeth, said discs being of substantially the same diameter and disposed in closely spaced relationship with their axes of rotation coincident means for driving said inner and outer cutting discs at substantial speed in opposite directions, the surface of said outer cutting disc opposite said driving means being concave and the surface of said inner cutting disc remote from said outer cutting disc being convex and provided with longitudinal cutting teeth for removing cut material from the path of said cutting teeth during operation.

7. A device as defined in claim 6 wherein said inner and outer cutting discs are mounted on concentrically rotatable coaxial shafts both operably coupled to said driving means.

8. A device as defined in claim 7 wherein bearing means are disposed between said cutting discs to maintain a fixed optimum relationship between said cutting discs whereby it is insured that said discs provide a shearing action along a narrow cutting plane.

9. A device as defined in claim 8 wherein the surface of said inner cutting disc facing said outer disc is recessed to receive said coaxially rotatable outer cutting disc substantially within said recess.

10. A device as defined in claim 9 wherein the concave surface of said outer cutting disc opposite said driving means is formed with a degree of concavity between 1° and 10°.

References Cited in the file of this patent

UNITED STATES PATENTS

| | | |
|---|---|---|
| 425,628 | Perry | Apr. 15, 1890 |
| 963,520 | Costello | July 5, 1910 |
| 1,534,908 | Browder | Apr. 21, 1925 |
| 1,723,999 | Bernard | Aug. 13, 1929 |